United States Patent [19]
Kanai

[11] Patent Number: 4,846,570
[45] Date of Patent: Jul. 11, 1989

[54] OVERHEAD PROJECTOR

[75] Inventor: Nobuo Kanai, Osaka, Japan

[73] Assignee: Minolta Camera Kabushiki Kaisha, Osaka, Japan

[21] Appl. No.: 155,298

[22] Filed: Feb. 12, 1988

[30] Foreign Application Priority Data

Feb. 13, 1987 [JP] Japan .................................. 62-31854

[51] Int. Cl.$^4$ ............................................. B03B 21/00
[52] U.S. Cl. ........................................ 353/98; 353/70; 353/DIG. 3; 353/101
[58] Field of Search .................... 353/100, 101, 98, 99, 353/DIG. 3, DIG. 4, DIG. 6, 69, 70, 119, 85, 87

[56] References Cited

U.S. PATENT DOCUMENTS

| | | | |
|---|---|---|---|
| 2,564,057 | 8/1951 | Fitzgerald | 353/DIG. 3 X |
| 3,081,670 | 12/1961 | Weisglass | |
| 3,547,530 | 12/1970 | Poole | |
| 4,002,408 | 1/1977 | Amma | 353/DIG. 3 X |
| 4,634,246 | 1/1987 | Dreyer, Jr. | |
| 4,735,500 | 4/1988 | Grunwald | |

FOREIGN PATENT DOCUMENTS

| | | |
|---|---|---|
| 5253425 | 10/1971 | Japan . |
| 47-26346 | 7/1972 | Japan . |
| 463402 | 4/1977 | Japan . |
| 55-18891 | 5/1980 | Japan . |
| 58-32691 | 7/1983 | Japan . |

*Primary Examiner*—Harry N. Haroian
*Attorney, Agent, or Firm*—Price, Gess & Ubell

[57] ABSTRACT

An overhead projector which has a stage for supporting an original thereon comprises an optical system for collecting light to the entrance pupil of a projection lens and a movable mirror for directing light from an illumination light source to an optical system.

The movable mirror is movable with the movement of the projection lens parallel to the plane of the stage for placing an original thereon so that trapezoidal distortion and loss of focus which occur when the projection lens projects an image at an oblique angle are avoided. The position for the collection of the illumination light by the optical system is changed according to the movement of the projection lens, and illumination light is always collected at the position of the entrance pupil of the projection lens.

14 Claims, 2 Drawing Sheets

OVERHEAD PROJECTOR

BACKGROUND OF THE INVENTION

This invention relates to overhead projectors and in particular to an overhead projector which is provided with a projection lens that is movable parallel to the plane of a stage on which an original is placed, and by this movement of the projection lens trapezoidal distortion of a projective image and loss of focus can be eliminated when projecting an original at an oblique angle to a screen at a vertical position.

This type of overhead projector is disclosed in Examined Japanese Patent Publication No. 55-18891 and U.S. Pat. No. 3,547,530 (Patented Dec. 15, 1970).

As illustrated in FIG. 1, when projecting an image to a vertical screen a at an oblique angle $\theta$, trapezoidal distortion and loss of focus occure on the projected image b of the screen. In order not to cause such trapezoidal distortion and loss of focus, a device is made to move a projection lens c and mirror g in the direction parallel to the plane of stage d.

By the way, in this type of overhead projector, it is required, in order not to lower the illumination efficiency, that the illumination light transmitted to illuminate an original through an illuminating system should always be collected at the position of an entrance pupil of the projection lens irrespective of the movement of the projection lens c.

In the said prior art, such requirement is satisfied by tilting a Fresnel lens h or by moving it parallel to the plane of a stage d on which an original is placed. However, this entails the problem that the construction of the device becomes complicated and the device itself becomes larger in size in order to move a larger and heavier Fresnel lens h alone or together with the stage d. Particularly, the type of device wherein the Fresnel lens is tilted becomes more complicated in construction since a light source e is also moved. Further, a simple and quick change of the lamp can not be hoped for because the light source also moves.

SUMMARY OF THE INVENTION

The main object of this invention is to provide an overhead projector whose construction is simple and compact, and advantageous in changing a lamp. The illumination light transmitted through the illuminating system can always be collected at an entrance pupil of a projection lens to whatever position it is moved, as a small and movable portion in the illuminating system also moves according to the movement of the projection lens.

The features to achieve the object of this invention consist in an overhead projector which is provided with a movable projection lens that moves parallel to the plane of a stage on which an original is placed, and it possesses a condensing lens in the lighting system to collect light from a light source to the position of an entrance pupil of the projection lens, and a movable mirror to direct light from the light source to the condensing lens with another means to change the position of light collection by the condensing lens by moving the movable mirror according to the movement of the projection lens.

It is a further object of this invention to provide an overhead projector by which the movement of a movable mirror, in accordance with the parallel movement of a projection lens to the plane of a stage on which an original is placed, is surely accomplished by a simple constructional interlocking means with the conventional overhead projectors.

A further feature to accomplish the object of this invention comprises two pulleys that are different in diameter but rotatable together, an end of one wire is fastened to one of the pulleys and another end of the wire is fastened to a projection lens, while an end of another wire is fastened to an end of the other pulley and the other end of the wire is fastened to a movable mirror. Thus, the movable mirror is made movable with the movement of the projection lens by the pulleys and wires.

Other objects and features of the present invention will be better understood from a consideration of the following detailed description taken in conjunction with the accompanying drawings.

DETAILED DESCRIPTION OF THE INVENTION

Referring to the accompanying drawings, an embodiment of the present invention will be described.

Figure 1:
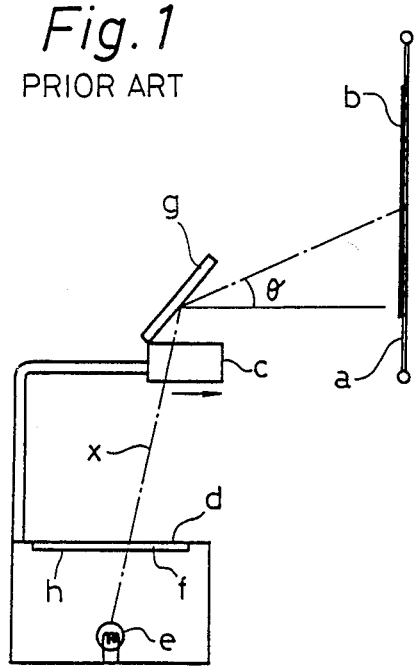
FIG. 1 is a side view of a prior art overhead projector to explain the prior art.
Figure 2:
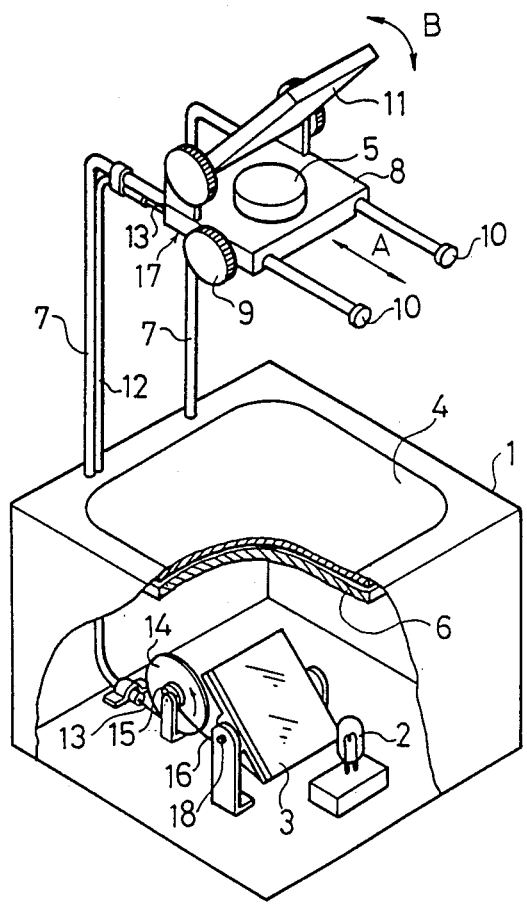
FIG. 2 is a perspective view of an overhead projector as an embodiment of this invention.
Figure 3:
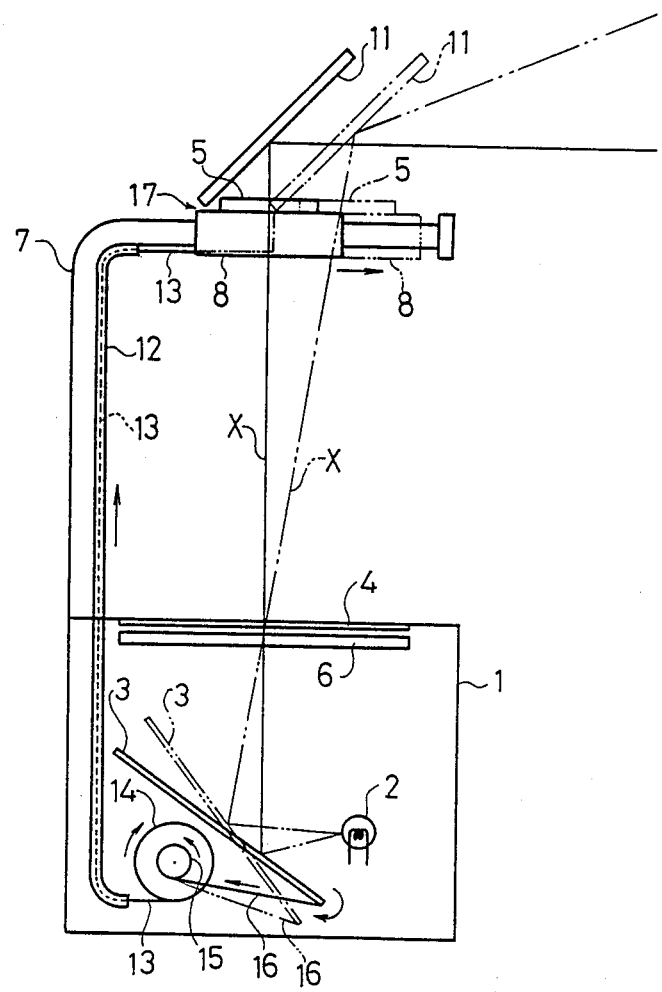
FIG. 3 illustrates a side view of the overhead projector shown in FIG. 2.

FIGS. 2 and 3 illustrate an overhead projector which is embodied by the present invention. The device comprises, like those already known, a base stand 1 on the upper surface of which a stage 4 is formed in the horizontal plane to place an original and a projector head 17 mounted above the base stand 1.

Projector head 17 is comprised of a projection lens 5 which projects an image of original on a stage 4 and a deflection mirror 11 which directs projected light from the projection lens 5 to a screen (not shown), and they are supported by a pair of reverse L-shape poles 7 secured at one side of the stage 4 on the base stand 1.

Inside the lower part of a base stand 1, a light source 2 and a movable mirror 3 to direct light from the light source 2 to a stage 4 are mounted and the movable mirror 3 is supported by a horizontal pin 18 rotatably. A Fresnel lens 6 as a condenser lens is mounted right below the stage 4 and collects light from the light source 2 through the movable mirror 3 to an entrance pupil of a projection lens 5.

A projection lens 5 is mounted on a lens holder 8 and it is possible to make focus adjustment. The focus adjustment is done by a rear focusing method taking advantage of the variation in focal length. By supporting the lens holder 8 in such a way as to slide on the crooked upper horizontal portion of a pole 7, it is possible for the projection lens 5 to move parallel to the plane of stage 4 in the direction indicated by arrow A. The movement of this projection lens 5 is made by operating a knob 9 mounted on a slide of the lens holder 8. Utilization of frictional force generated between a shaft of the knob 9 and the pole 7 or gearing of rack and pinion is suitable for this kind of machanism. Stopper 10 is provided at an end of pole 7 to protect the lens holder 8 from sliding off.

Deflection mirror 11 is supported on the upper surface of a lens holder 8 tiltably and movable in the direction of arrow A with the movement of a projection lens 5. It can also be rotated up and down independently on the lens holder 8 in the direction of arrow B. By movement of the deflection mirror 11 in the direction of arrow A with an up and down rotation in the direction of arrow B, light from the projection lens can be directed to a screen (not shown) at a desirable height. When projection is made at an angle of elevation to a vertical screen, trapezoidal distortion and loss of focus will occur on the projected image of the screen. However, such distortion and loss of focus can be eliminated by adjusting the position of the projection 5 in the direction of arrow A.

In a guide tube 12 supported along pole 7, wire 13 as shown in FIG. 3 is inserted for pulling. One end of this wire 13 is connected to a lens holder 8 and an another end is wound around a larger pulley 14 mounted in the base stand 1. The larger pulley 14 is biased in a direction to maintain the wire 13 in tension. A smaller pulley 15 is mounted on the same shaft as the larger pulley 14 to move together. This smaller pulley 15 and a movable mirror 3 are connected by a short wire 16. One end of the short wire 16 is wound around the smaller pulley 15 and fixed, and another end is connected to a lower end of the movable mirror 3.

By this means the amount of movement of the projection lens 5 in the direction parallel to surface of the stage is converted, through wire 13, into the rotation of a larger pulley 14, and between the larger pulley 14 and the small pulley 15, the amount of movement of the wire 13 is converted into the amount of movement of wire 16 at a fixed ratio, and an angle of inclination of the movable mirror 3 can be changed according to the amount of movement of the short wire 16.

By this action, displacement of optical axis X for light collection in the illumination system becomes possible, and it enables the Fresnel lens 6 to always collect light from the light source 2 to an entrance pupil of the projection lens 5. The direction correction of optical axis X for light collection can thus be achieved by the movement of a small movable mirror 3 only which is mounted in the illuminating system. The larger size device in a more complicated mechanism will, therefore, not be required. Further, as the light source 2 can be fixed at a certain position, it is quite advantageous to utilize a quick change system of lamp by preparing a spare lamp in a base stand 1. Still further, in order to correct the direction of the optical axis for light collection, the mechanism for interlocking a projection lens 5 and a movable mirror 3 is comprised of the wire mounted along pole 7, the small pulley in the base stand and another wire. Being simple in its mechanism, it can be easily adapted to a conventional overhead projector, and interlocking action is secured.

While the present invention has been described in connection with a specific embodiment, it is to be understood that the invention is not to be limited to the embodiment described. For example, the means for moving the movable mirror with the forward or rearward movement of the projection lens is not limited to the one described. All alterations and modifications falling within the spirit and scope of the inventions as set forth in the appended claims are included in the invention.

What is claimed is:

1. An overhead projector comprising:
    a light source,
    a stage having a support surface for placing an original thereon, the light source being fixedly mounted beneath the support surface,
    a projection lens movable parallel to the original support surface of the stage,
    a deflecting mirror for directing light which has passed through the projection lens to a screen,
    a condensing lens for collecting light from the light source and directing it to the position of the entrance pupil of the projection lens,
    a movable mirror provided for movement between the light source and the condensing lens for directing light from the light source to the projection lens, and
    means for changing the position of light collection by the condensing lens by moving the movable mirror in accordance with parallel movement of the projection lens.

2. An overhead projector according to claim 1 wherein Fresnel lens is used as condensing lens.

3. An overhead projector according to claim 2 wherein the Fresnel lens is mounted immediately below the stage and the light source is disposed under the Fresnel lens.

4. An overhead projector according to claim 1 wherein the movable mirror rotatable about a horizontal axis.

5. An overhead projector according to claim 4 wherein the projection lens is provided above a stage, and the movable mirror and the projection lens are connected by means for changing the position of light collection.

6. An overhead projector according to claim 5 wherein the projection lens 5 is mounted on a lens holder 8 and focus-adjustable by rear focusing method taking advantage of the variation in focal length.

7. An overhead projector according to claim 5 wherein means for changing the position of light collection includes:
    a first wire having one end connected to the projection lens,
    a first pulley for winding the other end of the first wire therearound,
    a second wire having one end connected to the movable mirror, and
    a second pulley mounted on the same shaft as the first pulley so as to be rotatable with the first pulley for winding thereon the other end of the second wire, the second pulley having a smaller diameter than the first pulley.

8. An overhead projector according to claim 1 wherein a deflection mirror and the projection lens are movable together.

9. An overhead projector comprising:
    a stage for placing an original thereon,
    a light source fixedly mounted under a stage and illuminate an original,
    a projection lens mounted above a stage,
    holding means to enable a projection lens to move in a direction parallel to the plane of a stage on which an original is placed,
    a deflection mirror mounted above a projection lens for directing light passed through a projection lens to a screen,
    a condensing lens for collecting light from the light source to the position of the entrance pupil of the projection lens, a movable mirror pivotally movably and provided in a light path between the light source and the condensing lens for directing light from the light source to the condensing lens, and means for associating the parallel movement of the said projection lens with the movement of the movable mirror for varying the position of light collection by the condensing lens according to the position of the projection lens.

10. An overhead projector according to claim 9 wherein the means for associating the movement of projection lens with the movement of the movable mirror, comprises:

a first wire having one end connected to a projection lens, a first pulley for winding the other end of the first wire therearound, a second wire having one end connected to a movable mirror, and a second pulley mounted on the same shaft as the first pulley so as to be rotatable with the first pulley for winding thereon the other end of the second wire, the second pulley having a smaller diameter than the first pulley.

11. An overhead projector according to claim 9 wherein the projection lens holding means comprises:

a holder for the projection lens, and a rod parallel to the original support surface of the stage for guiding and supporting the holder movably axially of the rod.

12. An overhead projector according to claim 11 wherein the projection lens is mounted on the lens holder and is focus-adjustable by rear focusing method involving variations in focal length.

13. In an overhead projector system for projecting an image of an original object such as a document or film mounted on a transparent support surface against a viewing surface with a source of light, the improvement comprising:

a projection lens assembly movable above and parallel to the support surface;

a first mirror mounted above the projection lens to reflect the projected image;

a second mirror movably mounted and positioned in a light path between the support surface and the source of light, and means for moving the first and second mirrors in coordination with the displacement of the projection lens assembly to vary the angle of a plane of the second mirror relative to its intersection with a plane containing the support surface.

14. The invention of claim 13 wherein the means for moving includes at least one wire interconnected with the mounting of the second mirror and the projection lens assembly.

* * * * *